United States Patent [19]
Andrews et al.

[11] Patent Number: 4,699,893
[45] Date of Patent: Oct. 13, 1987

[54] FLUID CRACKING CATALYST AND METHOD OF MAKING SAME FROM WASTE CATALYST MANUFACTURE FINES

[75] Inventors: Robert W. Andrews, Toms River; Francis L. Himpsl, Matawan; Barry K. Speronello, River Edge, all of N.J.

[73] Assignee: Engelhard Corporation, Edison, N.J.

[21] Appl. No.: 811,201

[22] Filed: Dec. 20, 1985

Related U.S. Application Data

[63] Continuation-in-part of Ser. No. 727,985, Apr. 29, 1985, Pat. No. 4,581,340, which is a continuation-in-part of Ser. No. 532,346, Sep. 15, 1983, Pat. No. 4,520,119.

[51] Int. Cl.[4] .............................................. B01J 29/06
[52] U.S. Cl. ......................................... 502/68; 502/64
[58] Field of Search .................... 502/65, 70, 68, 64

[56] References Cited

U.S. PATENT DOCUMENTS

3,499,846  3/1970  Michalko .............................. 502/65
3,503,874  3/1970  Michalko .......................... 502/65 X

*Primary Examiner*—Carl F. Dees
*Attorney, Agent, or Firm*—Inez Moselle

[57] ABSTRACT

An improved process for ion-exchanging sodium ions in particles containing sodium form zeolite crystals and sodium silicate. The process involves an initial ion-exchange at pH about 4.5 to 5.0 with an ammonium salt followed by exchange with an ammonium salt at about pH 2.0 to 3.5. Cracking catalysts having improved cracking activity are produced.

9 Claims, 1 Drawing Figure

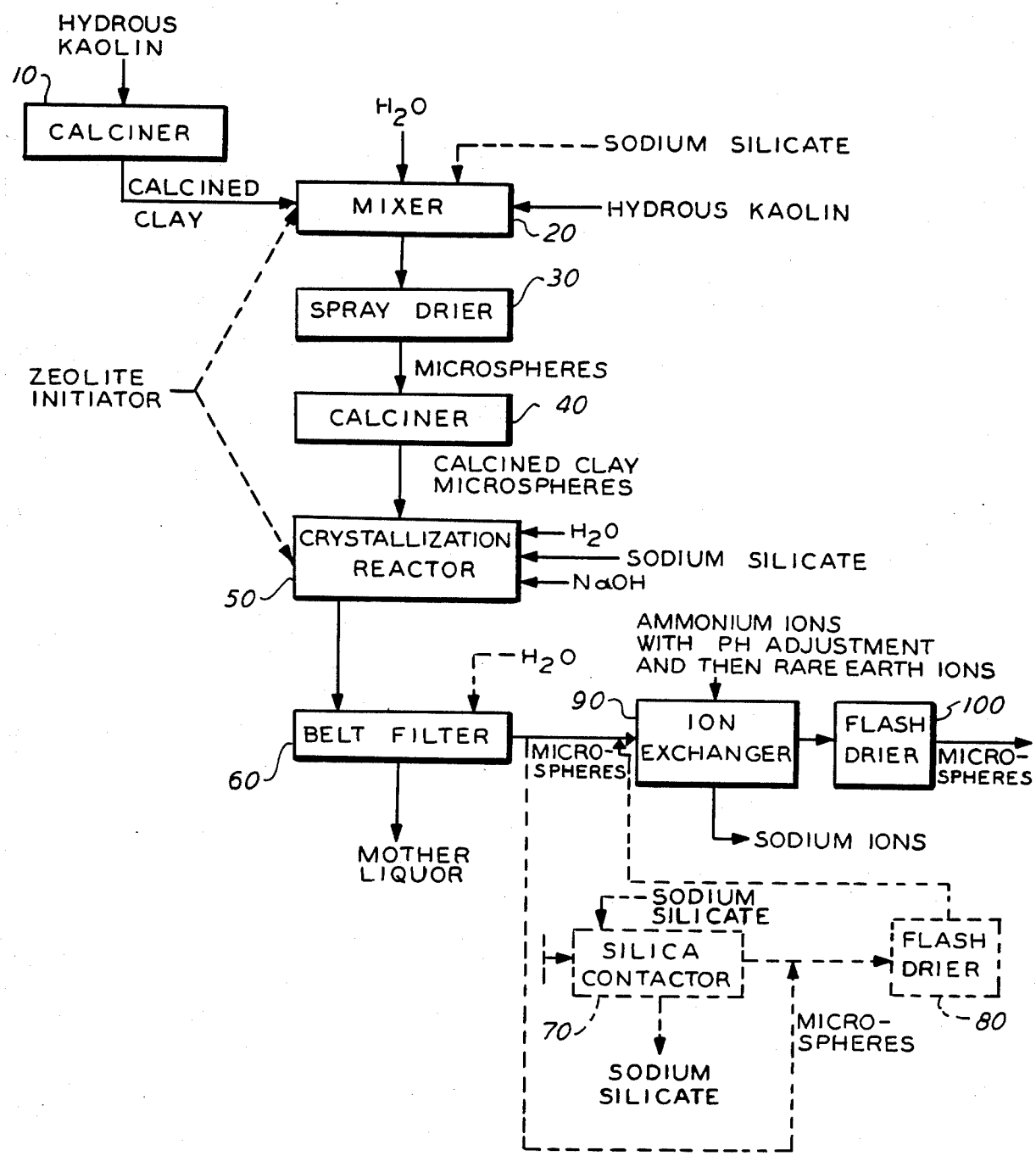

4,699,893

FLUID CRACKING CATALYST AND METHOD OF MAKING SAME FROM WASTE CATALYST MANUFACTURE FINES

RELATED APPLICATIONS

This is a continuation-in-part of Ser. No. 06/727,985, filed Apr. 29, 1985, now U.S. Pat. No. 4,581,340 which in turn is a continuation-in-part of Ser. No. 06/532,346, filed Sept. 15, 1983, now U.S. Pat. No. 4,520,119.

BACKGROUND OF THE INVENTION

This invention relates to processes for preparing cracking catalysts in which the particles contain finely divided crystals of a zeolitic molecular sieve component, e.g., synthetic crystalline faujasite, and a nonzeolitic component (e.g., silica-alumina, clay, clay residue). In particular, the invention relates to such processes wherein particles containing a sodium form of the zeolite and sodium silicate undergo ion-exchange with ammonium ions to replace sodium in the zeolite by treating with a solution containing ammonium ions to effect the replacement of sodium ions with ammonium ions.

In one embodiment of the invention, the sodium silicate is present as a result of the use of a sodium silicate solution to bind fine particle size zeolitic material into attrition-resistant, fluidizable microspheres. In such processes, sodium zeolite crystals are mixed with sodium silicate solution to provide a slurry which is then spray dried to form microspheres. U.S. Pat. No. 4,520,119 is illustration of such a process. Other examples are U.S. Pat. No. 3,451,948; U.S. Pat. No. 3,515,683 and U.S. Pat. No. 3,458,454. In the process described in U.S. Pat. No. 4,520,119, the fine particle size zeolitic material is a co-product of the manufacture of cracking catalyst from calcined clay by in situ procedures such as described in U.S. Pat. No. 3,647,718 and U.S. Pat. No. 3,663,165. Use of sodium silicate to bind co-product fines of the in situ process described in U.S. Pat. No. 4,493,902 is disclosed and claimed in copending application Ser. No. 06/727,985, filed Apr. 29, 1985.

In another embodiment of the invention, sodium silicate is absorbed in particles containing the sodium form zeolite by a process referred to as silica retention. Silica retention procedures designed to reduce micropore volume of catalyst precursor particles are described in U.S. Pat. No. 4,493,902, supra at column 14, line 63 to column 15, line 21, which is incorporated herein by cross-reference. Silica retention is also described in U.S. Pat. No. 3,663,165, column 6, lines 1-21. The in situ catalyst manufacturing process described in U.S. Pat. No. 3,663,165 is similar to the process described in U.S. Pat. No. 3,647,718. In these various in situ catalyst manufacturing processes, intermediates of zeolitic microspheres obtained by in situ syntheses from preformed microspheres of calcined clay generate sodium silicate mother liquors which are either retained in the microspheres and/or a sodium silicate solution from an extraneous source is added to the microspheres.

During the manufacture of cracking catalysts by the above, as well as other procedures, it is conventional to replace at least the readily exchangeable sodium ions in a sodium form zeolite with ammonium ions. In the case of faujasite zeolite, the sodium content of the particles before ammonium exchange is roughly of the order of 14.3% by weight of the zeolitic component, expressed as $Na_2O$. After exchange with ammonium ions to replace nore easily exchangeable sodium, a typical sodium level is about 1.5% by weight of the zeolitic component, expressed as $Na_2O$. After the more readily exchangeable sodium is replaced, the particles usually undergo further ion-exchange with ions such as rare earth, ammonium or mixtures of combinations thereof. In some cases, the partially exchanged material is calcined or steamed to facilitate release of difficult-to-exchange cations. This is followed by further exchange, typically with ammonium ions, rare earth ions, or mixtures or combinations thereof. Generally, sodium content ($Na_2O$) of the finished catalyst is less than 1 wt. %, frequently less than 0.5% wt. %, based on the total catalyst weight.

Solutions of sulfate chloride and nitrate salts of ammonium are commonly used to ion-exchange sodium in zeolites intended for use as cracking catalysts. Typically, exchange is with ammonium nitrate at pH 3-5 and elevated temperature, close to the boiling point. See, for example, U.S. Pat. No. 4,493,902 and U.S. Pat. No. 4,520,119. The '119 patent discloses (column 9) . . . "(I)t is desirable to maintain a pH low enough to ensure gellation of the silica but not destroy the zeolite content of the microspheres." The '119 patent teaches that optimally, the pH should be in the range of 3-5. In U.S. Pat. No. 3,451,948 (supra) ion-exchange after spray drying a slurry of fine particle size zeolitic material in sodium silicate solution is conducted by neutralizing the slurry at pH 5.5 at 30°-40° C. in the absence of ammonium nitrate, followed by exchange at pH 5.5-8.5 at 30°-40° C. with ammonium nitrate. The '948 teaches that pH should be maintained above 4. At alkaline pH values, ammonia fumes may cause difficulties in commercial operation. At strongly acidic pH values, destruction of the zeolite crystals may occur.

The commercial value of zeolitic cracking catalysts is influenced by activity, selectivity and attrition-resistance. Activity and selectivity are influenced by sodium level. Generally, low sodium is a prerequisite for the high activity desired in present FCC (fluid catalytic cracking) units. Attrition-resistance is dependent on manufacturing procedures. In the case of procedures that employ silica-retention or binding particulate zeolite with sodium silicate, variations in ion-exchange procedures can affect attrition resistance, activity and/or selectivity. Difficulty may be experienced in reducing sodium content to very low levels and maintenance of cracking activity may be therefore be less than desired.

The Invention

The present invention is concerned with improvements in the ammonium ion exchange treatment of sodium form zeolite when free sodium silicate is also present in particles containing crystals of the sodium form of zeolite. The present invention contemplates controlled ion-exchange treatsent of a sodium zeolite with ammonium ions to reduce sodium content when the sodium zeolite is present in particles which also contain sodium silicate. During the initial stage of ion-exchange with ammonium ions to replace readily releasable sodium ions, pH is maintained at value in the range of 4.5-5.0. Thereafter pH is reduced to values in the range of 2.0-3.5 and maintained in that range during further exchange with ammonium and/or other cations such as rare earth ions.

In one embodiment of the invention, sodium silicate solution is mixed with previously formed crystals of sodium zeolite and the mixture is formed into particles such as microspheres in which sodium silicate functions as a binder. The particles are subjected to the ion-exchange treatment of the present invention. Examples are the microspheres formed by mixing zeolite-containing co-product of in situ catalyst manufacture as described in Ser. No. 06/727,985, filed Apr. 29, 1985 and U.S. Pat. No. 4,520,119.

In another embodiment, the crystals of sodium zeolite are present in porous particles such as microspheres along with a matrix material. Sodium silicate is then absorbed by silica retention into the particles prior to ion-exchange treatment. Examples are silica-retained versions of FCC cracking catalyst intermediates described in U.S. Pat. No. 4,520,119; U.S. Pat. No. 3,647,718 and U.S. Pat. No. 3,657,548. In such cases, the sodium silicate serves as the precursor of silica which deposits in the pores of the composites and changes the micropore structure, thereby desirably affecting catalyst selectivity and hardness.

It has been found that if at least the initial contact of the microspheres with ammonium-ion exchange solution is carried out at relatively high pH (4.5–5.0), catalysts of improved activity result, compared with catalysts exchanged with ammonium ion at lower pH (2.0 to 3.5). During the initial exchange about 20% of the $Na_2O$ is removed. If the initial contact with ammonium ions is at too low a pH, e.g., pH 2.0 to 3.5, silicate will precipitate on the surface of microspheres containing sodium silicate as it will if low pH is maintained throughout ammonium ion exchange. This results in a loss of cracking activity. Photographs obtained by the SEM technique suggest that use of a low pH (2.0 to 3.5) throughout ion-exchange results in coating of zeolite crystals with amorphous silica. We believe that the presence of such a coating makes the catalyst less active. On the other hand, initial treatment with a relatively high pH medium selectively dissolves a portion of the occluded silicate. This is desirable, provided that not all of the silicate is removed during ion-exchange treatment. If the first exchange is at pH 5.5 to 8.5, e.g. pH 7, silicate-bonded products tend to be soft as a result of the dissolution of too much silica from the microspheres. Thus, we preferably reduce the pH of the slurry of zeolite containing microspheres (typically pH of 10.5–11.0) to 4.5 to 5.0 with a solution of an ammonium salt acidified to a pH of 4.5–5.0. We then adjust pH downward in order to remove more sodium and thereby provide catalysts with improved activity and stability in the presence of metals. We believe that activity maintenance is attributable to low sodium content. Thus, by the two stage ammonium exchange procedure of the present invention we can readily reduce sodium ($Na_2O$) levels to values of 0.35% or below; whereas ammonium exchange at 4.5–5.0 throughout will generally permit reduction of $Na_2O$ to levels of only about 0.50%. These differences have been found to result in significant difference in activity maintenance in FCC units. We prefer to use this novel ion-exchange technique with silica-retained microspheres for the same reason we use the technique to ion-exchange microspheres produced by spray drying crystals of zeolite with a solution of sodium silicate that forms a binder except that the hardness increase may not be perceptible with silica-retained microspheres.

DETAILED DESCRIPTION

We prefer to ion-exchange throughout at high temperature, e.g., 180° F. (82° C.) to 212° F. (100° C.). Operation at lower temperature, e.g., 86° F. (30° C.), results in less effective exchange efficiency. It should be noted that the ammonium ion-exchange procedure of U.S. Pat. No. 3,451,948 (supra) is carried out at 30°–40° C. at pH 5.0–8.5 throughout. Using the ion-exchange procedure of the present invention, high temperatures will not result in fuming of ammonia as would be expected to occur when practicing the ion-exchange procedure of U.S. Pat. No. 3,451,948 because of the lower pH used throughout our process.

Sufficient sodium should be exchanged with ammonium ions to reduce the $Na_2O$ of the zeolite-containing microspheres to a value below 1%, preferably below 0.5% and most preferably below 0.4%. The $Na_2O$ values are expressed on a volatile-free weight basis. Successive treatments have been required to reduce sodium to these low levels. The ammonium exchange treatment is usually followed by ion-exchange with rare earth ions, e.g., cerium ions or a mixture of rare earth ions.

It should be noted that once the dried microspheres have been acidified they should not be dried until the exchange treatment is complete. In other words, once wetted during acidification the microspheres should not be dried until ion-exchange is complete. Conventional driers, such as a flash dryer, can be used to dry the microspheres after the termination of ion-exchange.

1. Retaining Sodium Silicate in Microspheres Composed of Sodium Zeolite Y and Porous Matrix Referring to FIG. 1, there is shown a flow sheet for processes for making improved silica retained catalyst by the process of the '902 patent. The same processing downstream of the silica retention step would be used when preparing other silica retained catalysts, for example catalysts based on the teaching of the '718 or '165 patents.

In the first step, finely divided hydrous kaolin clay is calcined at least substantially through its characteristic exotherm in calciner 10. During calcination, a substantial portion of the finely divided clay is agglomerated into larger particles. After calcination, the agglomerated material is pulverized into finely divided calcined clay in a pulverizer (not shown). Next the finely divided kaolin clay that has been calcined at least substantially through its characteristic exotherm is slurried with finely divided hydrous kaolin clay and water in mixer 20. Perferably, zeolite initiator and a source of sodium silicate are also introduced into the mixer.

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an arorphous zeolite initiator in a sodium silicate solution. As used herein, "amorphous zeolite initiator" shall mean a zeolite initiator that exhibits no detectable crystallinity by x-ray diffraction.

The amorphous zeolite initiator may be prepared by mixing solutions of sodium silicate and sodium aluminate and aging the mixture for a time and at a temperature sufficient to form the amorphous zeolite initiator. Good amorphous zeolite initiators have been made by aging a mixture having the molar ratios indicated below for 24 or more hours at 100° F. (32° C.):

| Na$_2$O/SiO$_2$ | SiO$_2$/Al$_2$O$_3$ | H$_2$O/Na$_2$O |
| --- | --- | --- |
| 1.005 | 17.60 | 17.6 |

Best results have been obtained when a sodium silicate solution was added rapidly to a sodium aluminate solution, with rapid mixing, or when the two solutions were simultaneously added to a mixer, with rapid mixing. Further details about seeding appear in U.S. Pat. No. 4,493,902, the teachings of which are incorporated herein by cross-reference thereof.

The slurry made in mixer 20 is introduced into spray drier 30. In the spray drier, the slurry is sprayed from a wheel type atomizer into a chamber having an air inlet temperature of, e.g., about 1000° F. and air outlet temperature of, e.g., about 225° F. to form microspheres comprising a mixture of particles of hydrous kaolin clay and particles of kaolin clay that have been calcined at least substantially through its characteristic exotherm in the same microspheres.

The microspheres formed in the spray drier are then passed into calciner 40 where they are heated at a temperature and for a time sufficient to convert the hydrous clay into metakaolin.

Zeolite is allowed to crystallize in the spray dried microspheres by mixing the microspheres with at least water, one or more sources of sodium silicate and, if the microspheres were not internally seeded, amorphous zeolite initiator, and heating the resulting mixture to a temperature and for a time sufficient to crystallize at least about 40% by weight Y-faujasite in the microspheres. Sodium hydroxide may be added to the crystallization reactor 50 if it is necessary to raise the Na$_2$O content of the mixture in the reactor to obtain good crystallization.

The contents of the crystallization reactor 50 are preferably heated to about 200°–215° F. (99.3°–101.6° C.) during crystallization. The length of reaction time, of course, depends on a number of process variables, but typically is on the order of 10–24 hours. After the crystallization process is terminated, the microspheres with zeolite crystallized in them are separated from at least a major portion of their mother liquor. The preferred method for accomplishing this is by filtering, e.g., by belt filter 60. In the terminal portion of the belt filter, the microspheres may be contacted with water to wash residual mother liquor from the microspheres and to obtain microspheres that are substantially free of residual mother liquor. The microspheres obtained from belt filter 60, when dried, contain at least about 40%, and preferably about 50–70%, by weight Y-faujasite.

The sodium hydroxide and sodium silicate reactants may be introduced into the crystallization reactor from any suitable source. In a preferred embodiment, portions of the sodium silicate are provided by mother liquor recycled, in a concentrated form, from belt filter 60 and by mother liquor, in a concentrated form, produced during the crystallization reaction of another zeolite product, e.g., the concentrated mother liquor by-product produced during the manufacture of an HFZ ® catalyst.

Concentrating the mother liquor obtained from belt filter 60 may be accomplished by evaporating water from the mother liquor in concentrator 110. The mother liquor might contain, e.g., about 8% by weight Na$_2$O, about 14% by weight SiO$_2$, and about 0.1% by weight Al$_2$O$_3$. A concentrated mother liquor HFZ ® catalyst might contain about 15% by weight Na$_2$O about 29% by weight SiO$_2$ and about 0.1% by weight Al$_2$O$_3$. Sodium silicate solution having an SiO$_2$/Na$_2$O molar ratio higher than 2.0 (e.g., N ® Brand sodium silicate solution) may also be introduced into the crystallization reactor from a separate source.

After the crystallization reaction product is filtered from its mother liquor in belt filter 60, the next step in the process is to reduce the micropore volume of the microspheres by silica retention. Silica retention may be accomplished by either of two alternative processes.

In the first alternative, the microspheres with zeolite crystallized in them are separated from the zeolite crystallization mother liquor so that a portion of the mother liquor is left entrained within the microspheres. This may be accomplished simply by filtering the microspheres in the belt filter 60, without washing the microspheres with water. The microspheres are then dried, leaving a portion of the mother liquor (including sodium silicate) in them. In the second alternative, the microspheres separated in belt filter 60 are introduced into silicate contactor 70 where they are contacted with a sodium silicate solution, e.g., a solution containing about 20% by weight sodium silicate. Preferably, the contacting step takes place by moving the sodium silicate solution through a bed of microspheres. Next, the microspheres are dried leaving a portion of the sodium silicate in them. In both alternatives, drying is preferably conducted in flash drier 80, at an air inlet temperature of about 1100° F.

2. Spray Drying Slurry of Crystals of Sodium Zeolite Y in Sodium Silicate Solution The following is a description of the process using sodium zeolite Y crystals obtained as a co-product of fluid cracking catalyst manufacture by the '902 patent (described above) and spray drying the crystals with a sodium silicate binder. The same processing downstream of spray drying could be used with sodium zeolite Y crystals from other sources, e.g., the co-product of the '718 patent or the '518 patent.

The minus 20 micron fines present as a co-product in the alkaline sodium silicate mother liquor are used as the source of crystals of sodium zeolite Y. After the fines are physically isolated from the crystallized microspheres, the processing streams containing the fines are maintained separate from those containing the crystallized microspheres. It is desirable to prevent losses of the nominally 20 micron and finer particles into the grade sized (i.e., about 80 microns) crystallized microspheres in order to maximize production of both catalysts.

Hydroclones of conventional design can be used to separate a portion of the fine particles and mother liquor from the slurry of crystallized microspheres in mother liquor. A conventional vacuum belt filter can be used to drain the remainder of mother liquor from the crystallized microspheres. The size of the openings in the weave of the fabric on the belt and the amount of vacuum applied will influence the size of particles that pass into the filtrate. One or more additional hydroclones may be used to remove grade size microspheres from the filtrate and return them to the mainstream process; leaving the nominally −20 micron sized particles in the filtrate. The aqueous effluent containing fine particle sized solids from the vacuum filters or from the hydroclones is processed to remove the suspended particles which are then used as feed material in the process of the present invention.

Particle size of the feed for this embodiment of process of the invention is typically 10% to 70% finer than 1 micron equivalent spherical diameter (e.s.d.), preferably 50 to 70% finer than 1 micron. Particle sizes are determined by measurement on a conventional Sedigraph ® 5000 instrument. The present invention is especially applicable to processing fines that are associated with minimal amounts of grade material, i.e., attrition resistant microspheres larger than about 20 microns. Generally, less than 20 weight percent, preferably less than 10% and, most preferably less than 5% of grade material should be present in the fines.

Feed material for use in the process of invention has been obtained by scraping filter cakes from commercial rotary vacuum filters that had been precoated with filter aid, e.g., diatomaceous earth or perlite, and collecting the cakes over a period of time. Grade material had been removed from the mother liquor prior to charging the mother liquor to the drum filters. Typical chemical compositions of such cakes appear in the illustrative examples. The sodium zeolite Y content of representative feed material is in the range of 50 to 70%. Typical $SiO_2/Al_2O_3$ molar ratio of this component is about 4.4 to 4.7/1. BET surface area is typically in the range of 450 to 550 $m^2/g$ for representative feed material.

In making the determination of zeolite content and surface area, samples are dried but not washed before analysis. Procedures described in U.S. Pat. No. 4,493,902 are used in making these and other analyses described in the subject patent application.

Feed material scraped as filter cake from the precoated drum filters typically contains about 35-40% by weight of water. The cake should not be washed, dried or ground before it is mixed with sodium silicate solution and spray dried. The sodium silicate should be one having a sufficiently high $Na_2O/SiO_2$ ratio to be soluble at the concentration it is used. Commercial sodium silicate such as N ® Brand ($Na_2O/SiO_2$=about 0.31), can be used. This material is supplied as a solution containing about 62 weight % water and can be used without dilution or further concenration. Preferably, the sodium silicate has a higher $Na_2O/SiO_2$ molar ratio than 0.31 e.g., a ratio of about 0.40 to 0.55. Solutions which have $Na_2O/SiO_2$ ratios in this range are referred to herein as "sodium disilicate" although the silica content may be somewhat less than or more than that of a material whose analysis corresponds to $Na_2O:2.0\ SiO_2$.

Sodium disilicate solutions of approximately 40% solids ($Na_2O$ plus $SiO_2$) can be used without dilution or further concentration. Sufficient sodium silicate is added to result in a "silica dosage" in the range of about 0.60 to 0.80 preferably in the range of about 0.70 to 0.75, in the ion-exchanged microspheres, the dosage of the added silica being calculated on the volatile-free weight of the sodium-form microspheres. We found that the silica dosage is a primary variable influencing EAI of the catalyst product and that the amount is critical.

The term "silica dosage" as used herein is defined as the weight ratio of total soluble $SiO_2$ (i.e., that provided as added sodium silicate plus that adhering to the fines after collection) to the insoluble solids content of the fines sample. The latter quantity is typically determined by washing a sample of the fines with a mild caustic solution (pH=10), filtering to remove entrained silicate, drying, and then calcining at 1500° F. for one hour. The difference between the total solids content (fines+entrained silicate) and the insoluble solids content represents the amount of adhering sodium silicate, which is then taken into account in the calculation of total silica dosage. As mentioned, the especially preferred silica dosage is in the range of 0.70 to 0.75. We found that if the dosage is too low, the hardness of the product will suffer. This result was not unexpected since it is well known that it is difficult to cement large quantities of fine crystals of sodium zeolite Y. On the other hand, it was unexpected that hardness also suffered when too much sodium silicate binder was used. Physical examination of samples prepared with a silica dosages substantially in excess of those which resulted in products of acceptable hardness indicates that excessive use of silicate binder results in a low density "puffed" ball of silica in the microspheres.

Conventional spray driers can be used to convert the mixture of substantially -20 micron sized fines and sodium silicate solution into microspheres having an average diameter of about 60 to 80 microns. Optionally, hydrous kaolin clay can be included in the spray dryer feed. In operating the spray driers, the air outlet temperatures should be low e.g., (250° F.) 120° C. or below, in order to produce microspheres of sufficiently high bulk density, i.e., about 0.85 cc/g or above, preferably 0.90 cc/g or above, and most preferably 0.95 cc/g or above. Air inlet temperatures in the range of about 400° to 1100° F. (200° to 600° C.) are recommended. It has been found that spray dried microspheres having a bulk density below the preferred limits may have insufficient attrition-resistance to survive intact during the extensive ion-exchange treatsent that is required to reduce sodium content to desired low levels of less than 1% expressed as $Na_2O$. Also, ion-exchanged products having relatively low bulk density and inadequate attrition resistance (e.g., products having EAI value of 3.5% or above) may be obtained.

The microspheres that are filtered in belt filter 60 contain Y-faujasite zeolite in the sodium form. Typically, the microspheres contain more than about 8% by weight $Na_2O$. To prepare the microspheres of the present invention, a substantial portion of the sodium ions in the microspheres are replaced by ammonium or rare earth ions or both in ion exchanger 90 using the two stage ion-exchange treatment of the invention. The continuous counter current vacuum belt system described in U.S. Pat. No. 4,048,284 may be employed.

The following examples serve to illustrate some applications of the control of pH during ion-exchange and are given to aid in understanding the invention. The examples should not be construed as limiting the invention.

EXAMPLE 1

This example demonstrates the advantages of two stage ion-exchange procedure of the invention. In this example the zeolite microspheres that were subjected to various ion-exchange procedures had been obtained by mixing catalyst fines of the type obtained as a coproduct in the practice of the '718 patent with sodium silicate solution (about 0.47 dosage) and spray drying as described in Example 1 of U.S. Pat. No. 4,520,119. We believe that the same observations regarding difference in pH of ammonium exchange will be observed when using fines obtained from the in situ procedures (external and internal initiators) of U.S. Pat. No. 4,493,902. Thus, the staged pH ion-exchange (procedure D in this example) was used in all of the subsequent examples in which the fines utilized were obtained as a co-product in commercial practice of embodiments of the process of U.S. Pat. No. 4,493,902.

The sample of sodium-form microspheres used in this example had the following analysis (volatile-free weight basis) and characteristics:

| % Na$_2$O | % SiO$_2$ | % Al$_2$O$_3$ | % TiO$_2$ | % Fe$_2$O$_3$ | zeolite Y index % | zeolite B index % | unit cell size unit cell A. |
|---|---|---|---|---|---|---|---|
| 18.2 | 56.2 | 23.7 | 1.01 | 0.27 | 15 | 0.47 | 24.69 |

The sample was ammonium ion exchanged by five successive contacts with a 1:2 dilution of 54% aqueous ammonium nitrate solution, each at 180° F. (82° C.) for one hour. Each exchange step was conducted at 25% catalyst solids, and at carefully maintained pH, both during initial catalyst addition and in subsequent exchange steps, by the dropwise addition of concentrated nitric acid as required.

In system A, the pH of the catalyst/ammonium nitrate slurry was rigorously maintained in the range of 2.4–2.7 for each of the five successive exchange steps. In system B, the pH range maintained was 3.0–3.5, and in system C the pH range was 4.5–5.0. In the exchange system D, the first two exchanges were maintained in the pH range of 4.5–5.0, and the following three exchanges were maintained in the pH range of 2.4–2.7.

After ammonium ion exchange treatment, each of the catalysts was rare earth ion exchanged by two successive contacts with a rare earth solution (commercial mixed rare earth nitrate) containing 3.50% ReO (relative to the volatile free catalyst weight). Each of the rare earth ion exchange treatments was conducted for a period of one hour at 180° F. (82° C.), maintaining 30% catalyst solids and a pH in the range of 3.0–3.5. Finished catalysts were analyzed for sodium and rare earth content, hardness (by EAI), and activity by MAT testing after steam deactivation for 4 hours at 1450° F. (788° C.) (100% steam). The results are summarized in TABLE I.

TABLE I

Effects of Variable Ammonium Ion Exchange pH on Activity and Hardness of Catalysts Produced from Co-Product Fines and Sodium Silicate Binder

| System | Exchange pH | % Na$_2$O | % ReO | % Conversion* | RMA** | EAI |
|---|---|---|---|---|---|---|
| "A" | 5 × (2.4–2.7) | 0.36 | 3.92 | 70.0 | 77 | 1.66 |
| "B" | 5 × (3.0–3.5) | 0.48 | 3.48 | 70.9 | 81 | 1.85 |
| "C" | 5 × (4.5–5.0) | 0.51 | 4.19 | 76.5 | 108 | 1.92 |
| "D" | 2 × (4.5–5.0) + 3 × (2.4–2.7) | 0.35 | 2.94 | 75.5 | 102 | 1.90 |

*% Conversion (MAT) value reported is after 4 hours/1450° F. (788° C.) (100% steam). See U.S. Pat. No. 4,493,902 for details of the MAT test and pre-steaming treatment.
**RMA value reported is relative to HEZ ™ —53 Catalyst (3.03 activity after steaming 4 hours/1450° F. (788° C.) 100% steam).

In Table I, data on Na$_2$O/ReO exchange levels, activity performance and hardness on the four experimental systems is presented. It can readily be seen that as the pH of ammonium ion exchange is increased (systems A through C), activity increases markedly, even though the efficiency of sodium exchange (as evidenced from increasing Na$_2$O levels) is reduced. The effect on product attrition resistance is only slight (ca. 0.2 EAI units increase when exchange at higher pH). System D appears to present the most desirable exchange procedure, in that both a low Na$_2$O level (as may be desirable from the standpoint of catalyst metals tolerance performance) and a high activity level result.

EXAMPLE 2

This example demonstrates the importance of controlling silica dosage when producing a cracking catalyst from drum dryer fines obtained as a co-product in the manufacture of high zeolite content microspheres by the internal zeolite growth seed in situ procedure substantially as described in Example 6 of the '902 patent.

The feed material used in this example was a sample of the fine (−20 micron) particle size fraction recovered as a moist cake from conventional vacuum drum filters operating in a plant utilizing procedures substantially as described in Example 6 of U.S. Pat. No. 4,493,902. The filter aid employed in operating the drum filters was diatomaceous earth. The feed contained approximately 60% zeolite Y (the balance being a mixture of diatomaceous earth and the crystallization residue of calcined clay). Representative fines used in this example had the following chemical and physical properties:

| % Total Solids | % Insoluble Solids* | % Na$_2$O | % SiO$_2$ | % Al$_2$O$_3$ | % TiO$_2$ | % Fe$_2$O$_3$ |
|---|---|---|---|---|---|---|
| 55.3 | 34.0 | 10.4 | 54.5 | 32.8 | 1.28 | 0.29 |

*Measured as defined hereinabove to account for total soluble silica.

| zeolite Y Index | zeolite B Index | SiO$_2$/Al$_2$O$_3$ | BET surface area, m$^2$/g |
|---|---|---|---|
| 65 | 0.36 | 4.65 | 482 |

In the case of samples prepared with a 0.70 silica dosage (defined hereinabove) 2946 g of sample of the above fines was slurried in 1,046 g. of a sodium silicate solution (27.2% SiO$_2$, 15.2% Na$_2$O) with vigorous agitation. The amount of total soluble silicate in this system was varied to provide the desired SiO$_2$ dosages. Each mixture was spray dried using a nozzle atomization drier, maintaining an inlet temperature of 250°–275° C. (482° to 527° F.) and an outlet temperature of 105°–120° C. (221° to 248° F.). Each batch of resulting microspheres was then repeatedly exchanged with an ammonium nitrate solution to lower the sodium content to a value below 1% Na$_2$O (see Example 1, System D), and then rare earth ion exchanged as described in Example 1, System D.

The results, summarized below in Table II, show that the silica dosage level chosen was a critical determining factor of product hardness, and that a dosage value of 0.70 appears to yield the most favorable results.

TABLE II

| Effect of Silicate Dosage on Product Hardness | | |
|---|---|---|
| SiO$_2$ Dosage | Na + form EAI | RE$^{+3}$ form EAI |
| 0.45 | 1.9 | — |
| 0.55 | 1.0 | 2.4 |
| 0.70 | 0.64 | 1.7 |
| 0.70 | 0.51 | 1.9 |
| 0.75 | 0.62 | 2.1 |

TABLE II-continued

Effect of Silicate Dosage on Product Hardness

| SiO₂ Dosage | Na + form EAI | RE⁺³ form EAI |
|---|---|---|
| 0.80 | 0.83 | 2.9 |
| 0.90 | 1.8 | 3.5 |

EXAMPLE 3

It was further determined that suitably attrition resistant microspheres could be prepared from the fines obtained as a co-product by the internally seeded variation of the '902 process, such as described in Example 6 of U.S. Pat. No. 4,493,902 patent, by addition of a quantity of hydrous kaolin (e.g., ASP®-600 clay) along with sodium silicate in the spray drying step. This addition of hydrous clay may be desirable from the standpoint of improved economics due to the relatively low cost of the added clay, and as a potential means to modify catalyst activity. Variable amounts of added ASP-600® kaolin clay and sodium silicate binder were utilized with the fines described in Example 2. In each case, the silica dosage quoted was calculated based on the total quantity of insoluble solids, (fines+added ASP-600).

The sample with 0.55 $SiO_2$ dosage and 10% added ASP-600 was prepared as follows. A 3145 g sample of fines (45.5% total solids, 31.8% insoluble solids) and 119 g ASP-600 clay (16.0% LOI) were slurried in 1179 g sodium silicate solution (27.2% $SiO_2$; 15.2% $Na_2O$) with vigorous agitation. This mixture was spray dried and then ammonium and rare earth ion exchanged as in Example I, System D. In rare earth ion exchanged form, this sample had EAI of 1.9 after calcination at 1100° F.

Examination of the data shown in Table II-B reveals that the levels of added sodium silicate and ASP-600 clay must be carefully chosen so as to result in an attrition resistant catalyst. In this instance, a system containing 10% added ASP-600 with a 0.55-0.60 $SiO_2$ dosage appears to yield the best results.

TABLE II

Effects of Added ASP-600 and Silica Dosage on Product Hardness

| SiO₂ Dosage | % Added ASP-600 | Na + form EAI | RE⁺³ form EAI |
|---|---|---|---|
| 0.45 | 10 | 1.4 | — |
| 0.45 | 25 | 0.93 | 2.3 |
| 0.45 | 50 | 1.3 | — |
| 0.50 | 10 | 1.1 | — |
| 0.55 | 10 | 0.66 | 1.9 |
| 0.55 | 25 | 0.98 | 2.4 |
| 0.55 | 50 | 1.2 | 2.5 |
| 0.60 | 10 | 0.52 | 2.1 |
| 0.63 | 10 | 0.68 | 2.4 |
| 0.63 | 25 | 1.4 | 3.2 |
| 0.63 | 50 | 1.8 | — |
| 0.70 | 10 | 0.52 | 2.3 |
| 0.70 | 25 | 1.6 | 4.5 |
| 0.70 | 50 | 2.3 | — |

Catalyst prepared from fines in the preceding examples exhibit very high cracking activity in rare earth ion exchanged form, as well as low coke make and high gasoline yield. Results from the MAT testing of two representative samples are shown in Table III. The MAT test is described in the U.S. Pat. No. 4,493,902 patent.

TABLE III

MAT Activity/Selectivity Characteristics of Catalysts Prepared from Catalyst Co-Product Fines

| Sample Steam Treatment* (100% Stm.) | (0.70 Dosage) 0.46% Na₂O, 6.83% ReO | | | (0.55 Dosage, +10% ASP-600) 0.48% Na₂O, 5.82% ReO | | |
|---|---|---|---|---|---|---|
| | 1400° | 1450° | 1500° | 1400° | 1450° | 1500° |
| % Conversion | 90.5 | 86.7 | 75.9 | 87.8 | 83.9 | 71.5 |
| % Gasoline | 55.1 | 57.3 | 56.1 | 54.0 | 56.1 | 54.3 |
| % LCO | 7.30 | 9.79 | 15.2 | 8.56 | 11.1 | 17.2 |
| % C₄ Gas | 23.8 | 20.2 | 14.5 | 22.7 | 19.6 | 12.9 |
| % Coke | 11.6 | 9.16 | 5.32 | 11.2 | 8.27 | 4.24 |

*Each sample was steamed for 4 hours at the temperature indicated.

EXAMPLE 4

This example demonstrates the importance of controlling silica dosage when producing a cracking catalyst from drum filter fines obtained as a by-product in the manufacture of high zeolite content microspheres by the externally seeded zeolite in situ procedure substantially as described in Example 1 of the '902 patent. The example further demonstrates the improved hardness of the products obtained from co-product fines generated during external zeolite growth initiation as compared to products obtained from co-product fines generated during internal seeding.

Feed was a blend of batches of slurries of co-product fines. For purposes of analysis, a portion of the feed was filtered, washed with deionized water and oven dried at about 220° F. (105° C.) Following are analytical and physical properties:

| Chemical Analysis, wt % | | | | | |
|---|---|---|---|---|---|
| LOI | Al₂O₃ | SiO₂ | Fe₂O₃ | TiO₂ | Na₂O |
| 20.61 | 31.6 | 54.2 | 0.39 | 1.26 | 11.52 |

| Particle size determined by Microtrac | | | | |
|---|---|---|---|---|
| Microns | 0–20 | 0–40 | 0–60 | 0–80 | av. |
| % | 41 | 70 | 83 | 90 | 23 |

Particle size determined by Sedigraphs ® analyzer - 25% Solids 0% <2 micron 4% <5 micron 35% minus 10 micron 63% <20 microns; average —14 microns.

The feed was mixed with sodium silicate solution (0.65 dosage) (15.2%Na₂O; 27.2%SiO₂), and spray dried. The procedure was repeated within other portions of the same feed but using a 0.70 silica dosage.

Spray drying was carried out in a nozzle spray dryer operated with a feed rate of about 350 cc/min., air pressure of about 35 psi, inlet temperature of 245°–255° C., outlet temperature of 110–120, cyclone pressure drop of 7" H₂O and nozzle internal diameter of 0.09". The microspheres were ion-exchanged as described in Example 1, D.

Following is an analysis of the two products, Sample A, 0.65 silica dosage and Sample B, 0.70 silica dosage.

| Chemical Analysis, wt % | | | | | | | |
|---|---|---|---|---|---|---|---|
| Sample | LOI | Al₂O₃ | SiO₂ | Fe₂O₃ | TiO₂ | Na₂O | REO |
| A | 19.0 | 21.4 | 71.6 | 0.26 | 0.80 | 0.39 | 5.72 |
| B | 18.99 | 23.99 | 68.4 | 0.27 | 0.88 | 0.37 | 6.10 |

| | Physical Particle Size | | | | |
|---|---|---|---|---|---|
| Microtrac % | 0–20 micron | 0–40 micron | 0–60 micron | 0–80 micron | Av. size micron |
| A | 4 | 17 | 32 | 49 | 80 |
| B | 3 | 17 | 31 | 49 | 80 |

-continued

|   | Bulk Density g/cc | Surface Area m2/g | Zeolite Y Index % | Zeolite B Index % | unit cell sizes, A. |
|---|---|---|---|---|---|
| A | 0.64 | 326 | 20 | 0 | 24.69 |
| B | 0.89 | 335 | 23 | 0 | 24.68 |
| EAI (calcined 1100° F./1 hour 200/270 mesh) | | | | | |
| A | | | 2.4 | | |
| B | | | 0.92 | | |

Catalytic properties as determined by the MAT procedure are summarized in Table IV.

TABLE IV

| STEAMING TEMP.(°F.) | CONV. | ACT | $H_2$ | $IC_4$ | GAS | GSL | LCO | BTTMS | COKE | DRY GAS | $H_2CH_4$ | $C_4=/TC_4$ | $IC_4/C_4=$ |
|---|---|---|---|---|---|---|---|---|---|---|---|---|---|
| Sample A | | | | | | | | | | | | | |
| 1449 | 83.70 | 5.14 | 0.03 | 7.55 | 20.27 | 55.62 | 11.80 | 4.50 | 7.81 | 2.22 | 0.40 | 0.16 | 4.19 |
| 1449 | 82.22 | 4.62 | 0.03 | 7.43 | 19.94 | 12.47 | 54.53 | 5.31 | 7.75 | 2.16 | 0.34 | 0.16 | 4.09 |
| 1505 | 44.99 | 0.82 | 0.02 | 2.23 | 7.77 | 34.76 | 23.82 | 31.19 | 2.47 | 0.79 | 0.73 | 0.35 | 1.52 |
| 1505 | 52.75 | 1.12 | 0.03 | 2.42 | 8.42 | 41.43 | 24.88 | 22.37 | 2.90 | 0.87 | 0.90 | 0.35 | 1.53 |
| 1551 | 10.92 | 0.12 | 0.02 | 0.26 | 1.64 | 8.05 | 22.97 | 66.11 | 1.23 | 0.48 | 1.77 | 0.53 | 0.68 |
| 1551 | 11.37 | 0.13 | 0.02 | 0.25 | 1.65 | 8.40 | 23.03 | 65.62 | 1.31 | 0.38 | 1.80 | 0.59 | 0.54 |
| Sample B | | | | | | | | | | | | | |
| 1450 | 84.38 | 5.40 | 0.04 | 7.79 | 21.00 | 54.99 | 11.42 | 4.20 | 8.39 | 2.63 | 0.43 | 0.16 | 4.28 |
| 1452 | 86.43 | 6.37 | 0.04 | 8.09 | 21.55 | 55.91 | 9.87 | 3.70 | 8.97 | 2.75 | 0.53 | 0.14 | 4.82 |
| 1505 | 71.04 | 2.45 | 0.04 | 4.80 | 14.07 | 52.32 | 18.73 | 10.24 | 4.64 | 1.45 | 0.80 | 0.25 | 2.44 |
| 1505 | 69.46 | 2.27 | 0.03 | 4.58 | 13.64 | 51.46 | 19.45 | 11.08 | 4.36 | 1.32 | 0.70 | 0.27 | 2.22 |
| 1550 | 24.45 | 0.32 | 0.00 | 0.96 | 4.96 | 18.15 | 25.99 | 49.56 | 1.34 | 0.81 | 1.92 | 0.58 | 0.71 |
| 1550 | 25.01 | 0.33 | 0.01 | 1.77 | 3.91 | 19.88 | 25.33 | 49.66 | 1.22 | 0.17 | 1.95 | 0.48 | 1.05 |

EXAMPLE 5

The procedures of Example 4 were repeated with other samples of fines obtained as a co-product of externaly seeded zeolite microsphere synthesis in accordance with the teaching of U.S. Pat. No. 4,493,902. attrition resistance data for preparation formulated at various silica dosages ranging from 0.70 to 0.80 without hydrous clay addition and 0.55 with hydrous clay addition followed by ion-exchange in accordance with the present invention. A comparison of the results (TABLE V) with data in Examples 2 and 3 (internal seeds) surprisingly shows a substantial increase in hardness for the externally seeded material, when spray dried both "as is" and with 10% added ASP-600 clay.

TABLE V

Catalyst Prepared from Externally Seeded Catalyst Fines

| $SiO_2$ Dosage | % Added ASP-600 | Na + Form EAI (uncalcined) | ReO Form EAI (calcined) |
|---|---|---|---|
| 0.70 | 0 | 0.30 | 0.69 |
| 0.80 | 0 | 0.48 | 0.92 |
| 0.55 | 10 | 0.27 | 0.73 |

This unexpected increase in hardness prompted an examination of the internally and externally seeded fines for any differences in chemical or physical properties. Characteristics of the fines sample used in the study are shown below. Upon examination of the data, it can be seen that the two types of fines are very similar in overall composition, except the zeolite B content of the externally seeded sample is lower. It has been observed in studies that hardness increases with reduced zeolite B content; this observation may serve at least in part to explain the hardness difference. SEM examination of both types of fines confirmed the presence of a greater amount of zeolite B in the internally seeded fines. Both samples were relatively coarse and we consider that it is unlikely that particle size distribution made a difference. Full X-ray scans failed to show major differences.

| Fines Type | % $Al_2O_3$ | % $SiO_2$ | % $Na_2O$ | % $TiO_2$ | % $Fe_2O_3$ |
|---|---|---|---|---|---|
| External | 33.8 | 53.3 | 10.1 | 1.24 | 0.36 |
| Internal | 32.8 | 54.5 | 10.4 | 1.28 | 0.29 |

| Fines Type | Y Index | B Index | UCS | Surface Area |
|---|---|---|---|---|
| External | 59 | 0.14 | 24.68 | 536 |
| Internal | 65 | 0.36 | 24.68 | 482 |

| | PSD (by Sedigraph) | | | | |
|---|---|---|---|---|---|
| Fines Type | % < 1 u | % < 2 u | % < 5 u | % < 10 u | Av. (u) |
| External | 1 | 2 | 31 | 48 | 11 |
| Internal | 0 | 0 | 16 | 72 | 7.6 |

EXAMPLE 6

Catalytic Evaluation of Catalyst Made from Fines

Selected samples of spray dried fines, described in Examples 2, 3, 4, and 5 which aet the objective of <2.0 EAI were evaluated for catalytic activity and selectivity after being exchanged by the following ion exchange procedures (one initial $NH_4NO_3$ exchange at pH 4.5-5.0, followed by four subsequent exchanges at pH 2.7-2.9; then two rare earth exchanges, each at a 5.0% dosage, pH 2.7-2.9). Details of the ion-exchange treatment appear in Example 1. This exchange procedure resulted in $Na_2O$ levels of 0.43-0.48%, and ReO levels of 5.7-7.6%. An additional sample, was evaluated at lower $Na_2O$ content, obtained after seven $NH_4NO_3$ exchanges.

The samples tested were as follows:

| | Composition of Product | |
|---|---|---|
| Description | % $Na_2O$ | % ReO |
| "As is"* 0.70 silica dosage, Internally seeded (7× BEX) | 0.16 | 3.83 |
| "As is" 0.70 dosage, Internally seeded (5× BEX) | 0.46 | 6.83 |
| +10% ASP-600, 0.60 dosage, Internally seeded | 0.46 | 5.71 |
| +10% ASP-600, 0.70 dosage, Internally seeded | 0.43 | 7.63 |
| "As is" 0.70 dosage, Externally seeded | 0.48 | 6.34 |

*"As is" represents no added clay.
*BEX represents number of exchange treatment with ammonium nitrate.

Activity/selectivity plots were made to evaluate catalytic performance as determined by the MAT procedure for samples steamed at 1400° F.– 1500° F. (760° C. to 816° C.) and above. It was observed that all catalysts were of high activity [ca. 1.7-2.2 times that of HEZ-53 TM catalyst at 1450° F. (788° C.)] throughout the 1400°–1500° F. (760° to 816° C.) steaming range with the exception of the one sample prepared using externally seeded fines, which fell off sharply after 1500° F. (816° C.) steaming. All catalysts dropped sharply in activity when steamed above 1500° F. This was especially evidenced with the sample containing (0.16% $Na_2O$) which had the best activity at 1500° F. (most likely due to the low sodium content), but experienced nearly complete deactivation at 1520° F. (827° C.). Note that this sample also had a substantially lower rare earth content than the others tested, but still compared relatively favorably in hydrothermal stability.

Coke selectivities of the catalysts tested were all very low, equivalent or slightly lower than samples of catalyst obtained from fines by the procedure of Ser. No. 532,346. Gasoline and bottoms selectivities were also comparable to catalyst prepared from catalyst fines by the procedure of Ser. No. 532,346. In conclusion, it is apparent that fines produced from either the internally or externally initiated variations of the '902 patent may be successfully processed into attrition resistant catalysts with higher activity and comparable selectivity relative to catalysts obtained by the procedure of Ser. No. 532,346.

EXAMPLE 7

This example illustrates the embodiment of the invention in which sodium silicate is present in particles containing crystals of sodium zeolite as a result of silica retention. The feed material used in this example was a sample of the coarse (+20 micron) particle size fraction recovered as a moist cake from vacuum belt filters operating in a plant in which microspheres comprising about 25% sodium zeolite and a porous residue of calcined clay were produced by in situ crystallization substantially as described in U.S. Pat. No. 3,647,718. The solid reactants were a mixture of 95% by weight of microspheres of kaolin clay calcined to pass through the kaolin microspheres of kaolin clay calcined to pass through the kaolin exotherm and 5% by weight of microspheres of kaolin clay calcined to metakaolin condition. The solids were slurried in 18% NaOH solution used in amount calculated to provide 0.63–0.65 moles $Na_2O$ per mole of $Al_2O_3$ in mixtures of microspheres. The slurry was aged at about 100° F. for about 6 hours and heated at about 180° F. for about 18 hours to crystallize about 25% sodium zeolite Y.

The resulting flash dried microspheres containing zeolite Y in sodium form and retained sodium silicate were recovered and ion-exchanged. In a control test, sodium was reduced from 12 $Na_2O$ to 0.3% $Na_2O$ using countercurrent contact in a belt filter substantially as described in U.S. Pat. No. 4,048,284 with ammonium nitrate solution of 27% wt. % concentration at 180° F., and pH maintained at 2.5 to 3.5 throughout the exchange. Rare earth exchange was then carried out with a solution of mixed rare earths in nitrate form at pH 3.0 at 180° F. The products produced under these conditions contained about 0.5–0.6% $Na_2O$, about 2% ReO and about 16% zeolite Y as determined by X-ray analysis.

For purposes of comparison, pH of the ammonium nitrate solution was varied. During initial exchange pH was maintained at 4.5 by reducing the acid addition to the first reslurry tank. Sodium levels after initial exchange were in the range of 1.5 to %3.0 $Na_2O$. Thereafter, ammonium nitrate preacidified to pH value of 0.3 was used in order to control the pH during ion-exchange to 3.0 or below. In some runs the pH of the "final" exchange was controlled to a pH of 2.5 by adding nitric acid. In other runs, the pH of the "final" exchange controlled to 2.0. In some runs, after ammonium nitrate exchange was complete, the material was ion-exchanged with rare earth nitrate solution at pH 3.

It was found that the material obtained by initially exchanging at pH 4.5 with ammonium nitrate, followed by subsequent exchange with ammonium nitrate at pH 2.0 had a lower $Na_2O$ contents, in the range of 0.3–0.4%, than products obtained in the control tests (0.5–0.6% $Na_2O$) while maintaining zeolite content about the same levels. Conversion values were reported for samples steamed for 4 hours/1450° F. (788° C.) with 100% steam as described in U.S. Pat. No. 4,493,902. RMA values were reported as relative to HEZ TM -53 catalyst (3.03 activity) after steaming 4 hours/1450° F. (788° C.) with 100% steam. Consistent with the reduced sodium level was a statistically significant increase in activity (RMA) from an average of 107 to 123.

The percentage of Y-faujasite zeolite in the catalyst described herein was determined while the microspheres were in the sodium form. The zeolite content of the microspheres in sodium form is determined by technique described in the ASTM standard method of testing titled "Relative Zeolite Diffraction Intensities" (Designation D3906-80) or by an equivalent technique. When analyzed in rare earth exchanged form, the apparent content of Y zeolite will be lower, typically about 15% lower, due to absorption of X-rays by rare earth ions. Although zeolite B may be a component of the feed material such zeolite is not detectable by X-ray diffraction in the product after the ion-exchanged product is calcined or steamed. In other words, the B zeolite is converted into an amorphous silica-alumina matrix component before or during use in a refinery. The Y-zeolite component in sodium form, generally has a crystalline unit cell size of less than about 24.75 A and most preferably less than about 24.72 A.

For the purpose of this application, all percentages of $Na_2O$ and REO in the zeolite-containing microspheres are calculated on a volatile free weight basis. The quantity of volatile material in the microspheres is determined by measuring the weight loss of the microsphres after they are calcined first for 1/2 hour at about 800° F. (430° C.) and then for 1 hour at about 1830° F. (1000° C.). Other test procedures mentioned here are set forth in U.S. Pat. No. 4,520,119.

We claim:

1. An improved process for ion-exchanging particles comprising crystals of a zeolite having sodium as substantially all of its exchangeable ions with an ammonium salt solution, said particles containing said zeolite also containing sodium silicate, the improvement comprising ion-exchanging the particles at a pH initially in the range of about 4.5 to 5.0 and thereafter at a pH in the range of about 2.0 to 3.5.

2. The process of claim 1 wherein said zeolite is sodium zeolite Y.

3. The process of claim 1 wherein the $Na_2O$ content of said particles is reduced to a value below 0.5% by weight.

4. The process of claim 1 wherein said particles are obtained by crystallizing sodium zeolite Y from preformed microspheres of calcined clay by reaction with sodium hydroxide, thereby forming porous microspheres comprising sodium zeolite Y and a residue of calcined clay and a sodium silicate mother liquor, and said sodium silicate is present in said particles comprising zeolite in sodium form as a result of incomplete washing of sodium silicate mother liquor from said porous microspheres, addition of sodium silicate solution to said porous microspheres or both.

5. The process of claim 1 wherein said particles are obtained by crystallizing sodium zeolite Y from microspheres of calcined clay by reaction of the microspheres of calcined clay with sodium silicate solution in the presence of seeds, thereby forming porous microspheres comprising sodium zeolite Y and a residue of calcined clay and also forming a sodium silicate mother liquor, and said sodium silicate is present as a result of incomplete washing of mother liquor, addition of sodium silicate or both.

6. The process of claim 1 wherein said particles are obtained by mixing crystals of zeolite with sodium silicate solution to form microspheres in which sodium silicate functions as a binder.

7. Cracking catalysts made by the process of claim 4.

8. Cracking catalysts made by the process of claim 5.

9. Cracking catalysts made by the process of claim 6.

* * * * *